United States Patent
Ambrose

(10) Patent No.: US 7,426,056 B2
(45) Date of Patent: Sep. 16, 2008

(54) METHOD AND APPARATUS FOR A CLIENT CALL SERVICE

(75) Inventor: Kevin B. Ambrose, Richardson, TX (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 10/756,139

(22) Filed: Jan. 13, 2004

(65) Prior Publication Data

US 2005/0154604 A1 Jul. 14, 2005

(51) Int. Cl.
*G06K 15/00* (2006.01)
*G06F 17/00* (2006.01)

(52) U.S. Cl. ...................... 358/1.16; 715/229
(58) Field of Classification Search ............... 358/448, 358/403, 404, 405, 1.15; 715/215, 229, 67; 713/1, 2

See application file for complete search history.

(56) References Cited

U.S. PATENT DOCUMENTS

| | | | | |
|---|---|---|---|---|
| 6,542,943 | B2 | 4/2003 | Cheng et al. | 710/36 |
| 6,704,782 | B1* | 3/2004 | Achtermann et al. | 709/224 |
| 7,190,481 | B2* | 3/2007 | Hirabayashi | 358/1.18 |
| 7,191,391 | B2* | 3/2007 | Takashima | 715/236 |
| 7,257,308 | B2* | 8/2007 | Plourde et al. | 386/46 |
| 2002/0032763 | A1 | 3/2002 | Cox et al. | 709/223 |
| 2002/0073047 | A1 | 6/2002 | Morrison | 705/71 |
| 2002/0105664 | A1* | 8/2002 | Inoue et al. | 358/1.13 |
| 2002/0128984 | A1 | 9/2002 | Mehta et al. | 705/71 |
| 2002/0157041 | A1* | 10/2002 | Bennett et al. | 714/43 |
| 2002/0188852 | A1* | 12/2002 | Masaki et al. | 713/182 |
| 2003/0046675 | A1 | 3/2003 | Cheng et al. | 717/173 |
| 2003/0046676 | A1 | 3/2003 | Cheng et al. | 717/173 |
| 2003/0126462 | A1* | 7/2003 | Howard et al. | 713/200 |
| 2004/0068724 | A1* | 4/2004 | Gardner et al. | 717/173 |
| 2004/0078289 | A1* | 4/2004 | Barid | 705/26 |

(Continued)

FOREIGN PATENT DOCUMENTS

| | | |
|---|---|---|
| EP | 0841616 A2 | 5/1998 |
| WO | WO 02/45316 | 6/2002 |
| WO | WO 02/071287 | 9/2002 |
| WO | WO 02/084947 | 10/2002 |

OTHER PUBLICATIONS

Jang et al., "SODA: A Service-On-Demand Architecture for Application Service Hosting Utility Platforms", Proceedings of the 12th IEEE International Symposium on High Performance Distributed Computing, IEEE 1082-8907/03, 2003, 9 pages.

*Primary Examiner*—Jerome Grant, II
(74) *Attorney, Agent, or Firm*—Duke W. Yee; Matthew W. Baca

(57) ABSTRACT

A method, apparatus, and computer instructions for providing access to an application. An operating system is identified on the client responsive to receiving a request for access to the application from a client. An appropriate version of the application for the client is selected in response to identifying the operating system. The files required on the client are sent for execution of the appropriate version of the application to the client. A billing process is initiated to identify an amount time during which the appropriate version of the application is used on the client.

1 Claim, 4 Drawing Sheets

U.S. PATENT DOCUMENTS

2004/0172336 A1* 9/2004 Forsell et al. ............... 705/26
2004/0215578 A1* 10/2004 Das ........................... 705/77
2005/0021414 A1* 1/2005 Liebenow .................. 705/26
2005/0064939 A1* 3/2005 McSheffrey et al. ......... 463/42
2005/0262088 A1* 11/2005 Solis et al. .................. 707/10

* cited by examiner

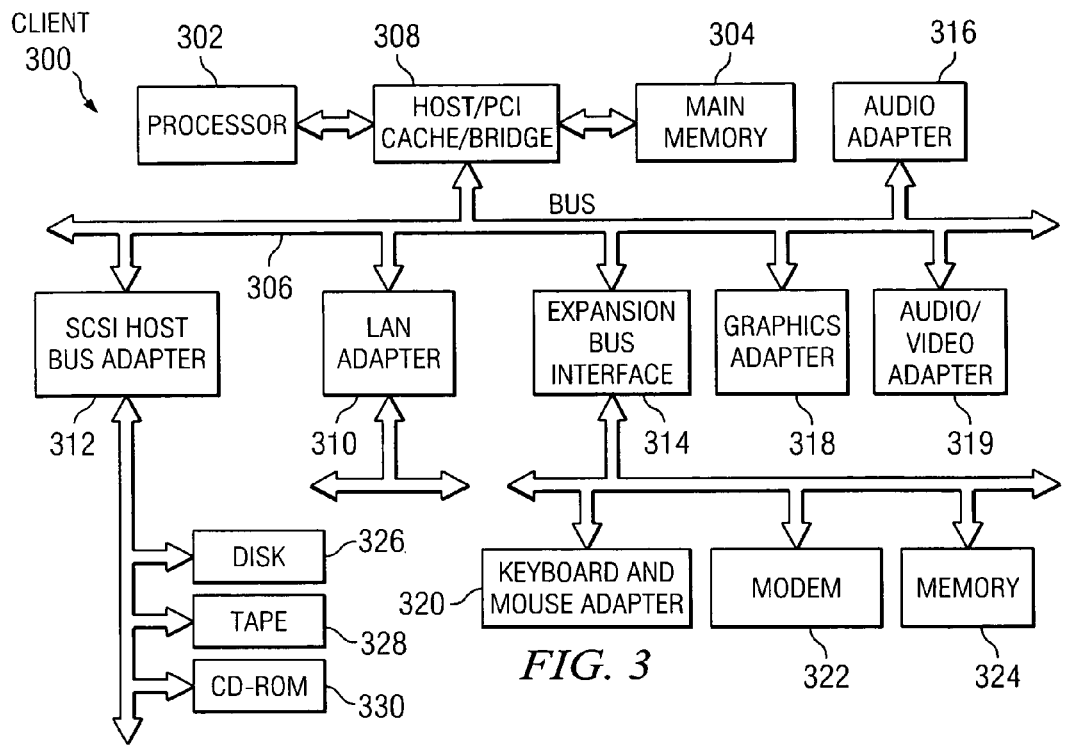
FIG. 3
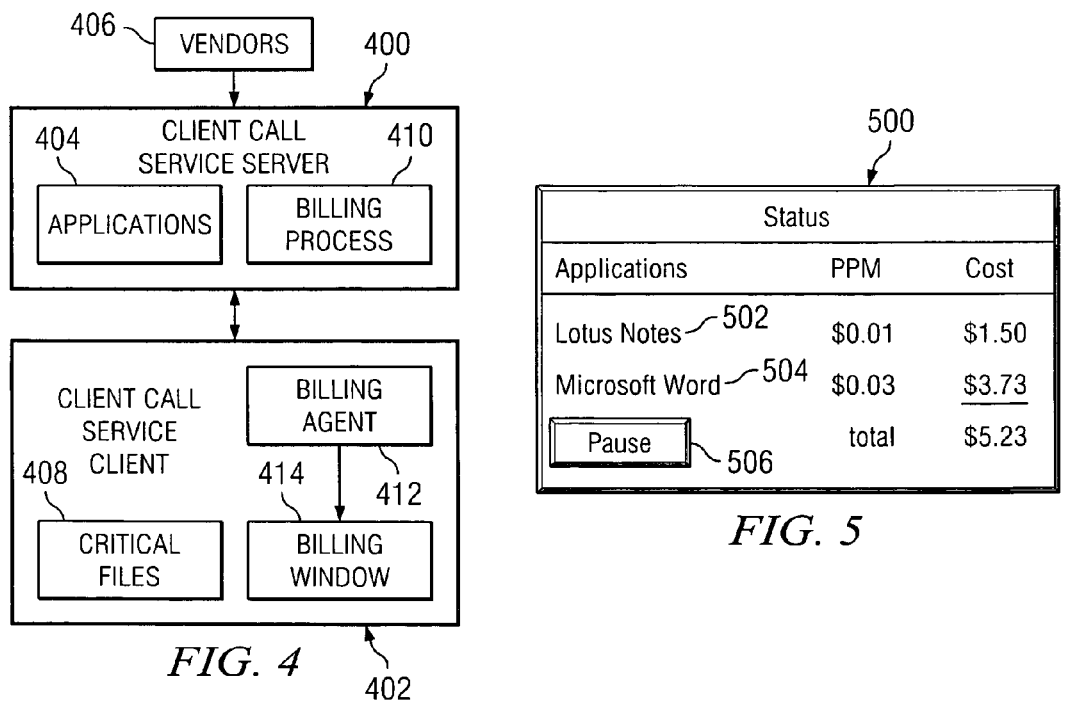
FIG. 4
FIG. 5

METHOD AND APPARATUS FOR A CLIENT CALL SERVICE

BACKGROUND OF THE INVENTION

1. Technical Field

The present invention relates generally to an improved data processing system and in particular to a method and apparatus for processing data. Still more particularly, the present invention relates to a method, apparatus, and computer instructions for providing access to applications.

2. Description of Related Art

In today's personal home computing environments, users purchase and maintain various application software to perform various tasks. These tasks include creating documents, such as letters or notes using word processing programs. Additionally, users may maintain budgets and personal finance projections with financial programs. E-mail programs are employed to send and receive messages. Much time and money is wasted on upgrading this application software. Some products are installed and distributed with "bugs" or security holes. Installation of these applications typically requires a re-installation effort to deploy fixes, patches, and/or upgrades.

Additionally, many software packages purchased by users contain applications that are never used by those users. For example, the user may purchase an application package that is bundled with a word processing program, a spreadsheet program, an e-mail program, and a database access program. In many instances, the user will never use the database access program. As a result, the user has wasted money and disk space by installing the package. Additionally, depending on the location and market, some home users may require applications to complete certain tasks but find that those applications are not readily available. For example, vendors may not offer a particular application or version of an application in certain countries. Further, some business users require applications that are available at work, but not at home in order to perform some tasks from home.

Additional time and money are wasted because many software vendors generate upgrades for software packages on a yearly basis. Users are forced to purchase these upgrades in order to use the new features in these more recent versions. In order to share these new documents or files, other users are forced to upgrade their software packages in order to use these new documents or files because these documents or files were created with a newer version of a software package and may not be compatible with those of an older version.

Therefore, it would be advantageous to have an improved method, apparatus, and computer instructions for allowing a user to access applications without requiring maintenance of those applications.

SUMMARY OF THE INVENTION

The present invention provides a method, apparatus, and computer instructions for providing access to an application. An operating system is identified on the client responsive to receiving a request for access to the application from a client. An appropriate version of the application for the client is selected in response to identifying the operating system. The files required on the client are sent for execution of the appropriate version of the application to the client. A billing process is initiated to identify an amount time during which the appropriate version of the application is used on the client.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a diagram illustrating components used in providing applications to a user in accordance with a preferred embodiment of the present invention;

FIG. 5 is a diagram illustrating a billing window in accordance with a preferred embodiment of the present invention;

DETAILED DESCRIPTION OF THE PREFERRED EMBODIMENT

Figure 1:
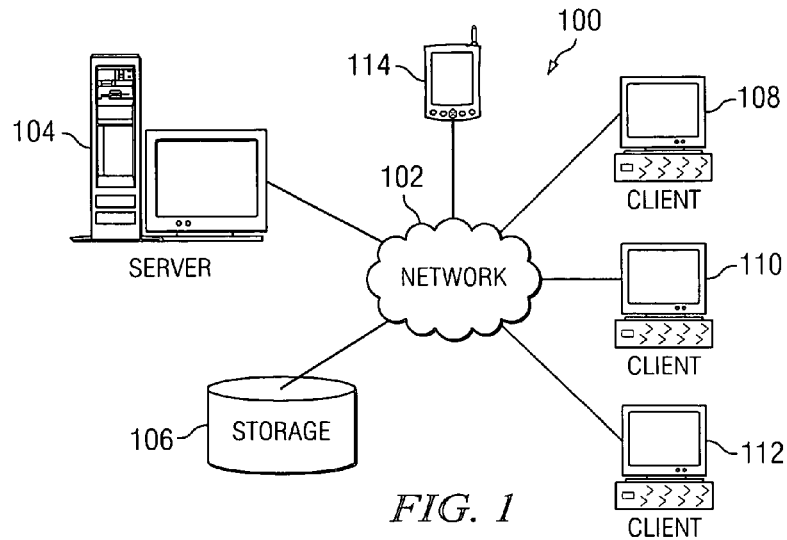
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, 112, and 114 are connected to network 102. Clients 108, 110, and 112 may be, for example, personal computers or network computers. Client 114 is a portable client, such as a personal digital assistant (PDA). In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
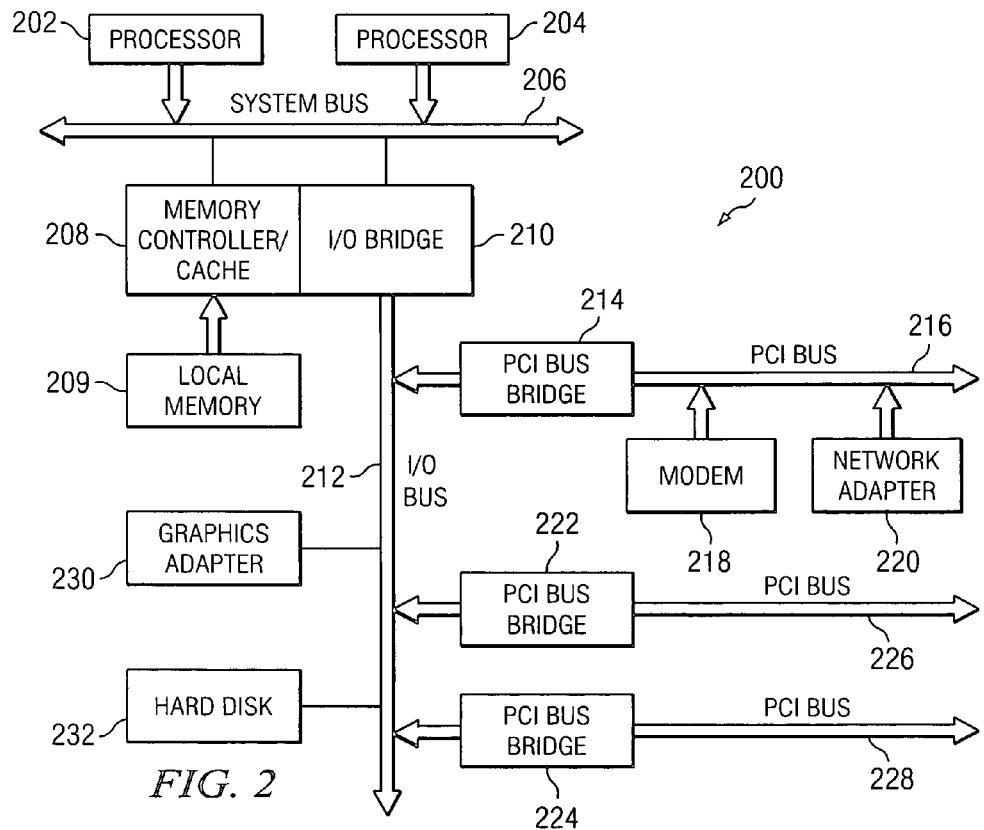
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for allowing a user to access and use applications without having to maintain those applications. The mechanism of the present invention allows a user to access applications located on a remote server. A user at a client may make a call or log in to the remote server and request applications for use. In response to such a request, critical files needed for execution of the applications are sent to the client. These files are ones that are needed by the client to properly execute the applications.

The client executes these applications and is billed based on the amount of time that the application is used. Additionally, some essential files are maintained on the server to prevent the user from using the applications without being connected to the server. This mechanism is also referred to as a client call service and allows the home user to execute any application from anywhere at any time.

The mechanism of the present invention avoids the user having to upgrade, install patches or fixes, or locate hard to find applications. In these illustrative examples, the applications are purchased from vendors through a concurrent use license allowing a number of concurrent users to use the applications.

With reference now to FIG. 4, a diagram illustrating components used in providing applications to a user is depicted in accordance with a preferred embodiment of the present invention. In this illustrative example, client call service (CCS) server 400 may be access by CCS client 402. In particular, a user at CCS client 402 may desire to use one or more of applications 404 located on CCS server 400. These applications are placed on CCS server 400 from vendors 406 through various licensing and purchase agreements. In these illustrative examples, concurrent use licenses are desired for placing applications 404 on CCS server 400. CCS server 400 in this illustrative example may be implemented as software on a data processing system, such as data processing system 200 in FIG. 2. CCS server 400 provides access to different users by storing customer or client information in a customer profile. In this illustrative example, this customer profile contains, for example, a name, a billing address, and an e-mail address.

CCS server 400 is a logical server and may actually take the form of a group of physical servers. This server contains applications from different vendors along with an ability to distribute critical install files to CCS client 402, which are stored in critical files 408. In the illustrative examples, CCS server 400 contains the latest applications with appropriate patches and upgrades already applied. As a result, the user at the client is not required to perform any sort of patching or upgrading.

CCS client 402 uses a high-speed or broadband connection to communicate with CCS server 400. CCS client 402 registers with CCS server 400 in order to use applications 404. In these examples, user files are kept locally on CCS client 402 for security reasons. These user files are stored with critical files 408. Only application files are distributed across the network data processing system between CCS server 400 and CCS client 402. Such a feature is especially important when the network data processing system involves the Internet. CCS client 402 may be implemented-as software executing on a data processing system, such as data processing system 300 in FIG. 3.

Billing process 410 is a monitoring process that monitors what software applications are used by a client and generates data for billing purposes. This data is stored and may be combined into a monthly statement for the user. Billing process 410 also includes a client-side component, billing agent 412. Billing agent 412 displays billing window 414 to provide status information to the user. This information includes, for example, the name of currently used applications along with their respective prices on a permanent basis. These prices are illustrated because some applications may cost more to use than other applications.

Billing window 414 is updated on a minutely basis in these depicted examples. Additionally, a running tab of total cost for the session also may be displayed within billing window 414. Billing agent 412 also provides a pause feature that may be accessed through billing window 414. If the user needs to "pause" the use of critical files 408, the user may enter an appropriate user input to pause the use of critical files 408. In these illustrative examples, the input may be made through a pause button displayed in billing window 414. The user may need to pause the use of critical files 408 for reasons, such as, for example, to answer a phone call or to read a document. The windows for applications will continue to be displayed on CCS client 402, but the applications are in a locked or read-only mode.

In this illustrative example, a user at CCS client 402 logs onto CCS server 400 and locates an application from applications 404. The application may be, for example, an editing or word processing application. CCS server 400 verifies the client operating system and sends the appropriate files to CCS client 402 to form critical files 408. When the user completes the editing process and closes the application, the user then locates an e-mail or notes program from applications 404. The files for this application are sent from applications 404 to critical files 408. Files, such as a personal address book are permanently stored as part of critical files 408.

The user then generates an e-mail message attaching a picture and sends the message. The user then closes the application and logs off CCS server 400. In response, billing agent 412 sends billing information back to CCS server 400. Billing process 410 stores this information and generates a total usage bill on some periodic basis, such as on a monthly basis. This bill combines all applications and times used by the user and the bill is sent to the user.

With reference next to FIG. 5, a diagram illustrating a billing window is depicted in accordance with a preferred embodiment of the present invention. Billing window 500 is an example of billing window 414 in FIG. 4. As can be seen, billing window 500 lists applications on lines 502 and 504. Additionally, each line also shows a price per minute (PPM) for each of the applications. Also, a total cost for the usage thus far also is displayed on billing window 500. In this example, line 502 shows that Lotus Notes is one application used by the user, with Microsoft Word in line 504 being a second application selected by the user.

The user may pause usage of the applications by selecting "Pause" button 506. Selection of this button results in the applications being locked or frozen. The user may still view the windows but functionality for the programs is halted. In this manner, the user may attend to other tasks, such as answering a phone or reading a document without being charged for use when the applications are not in use by the user.

Figure 6:
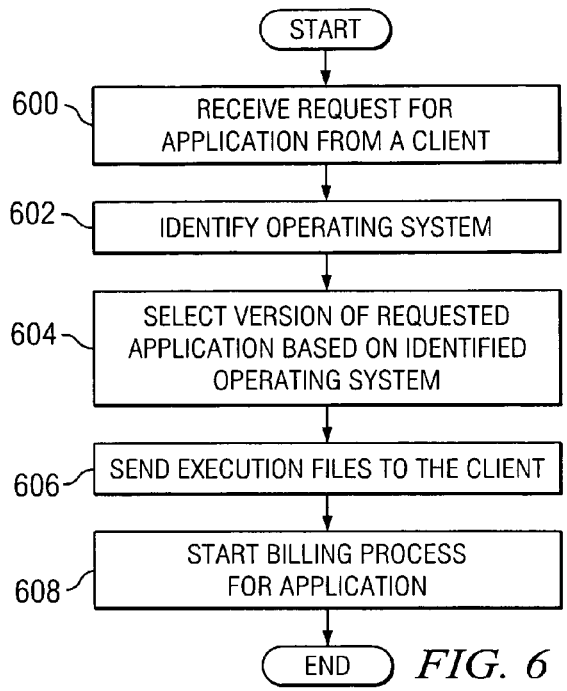
FIG. 6 is a flowchart of a process for providing a user access to applications on a server in accordance with a preferred embodiment of the present invention.

Turning next to FIG. 6, a flowchart of a process for providing a user access to applications on a server is depicted in accordance with a preferred embodiment of the present invention. The process illustrated in FIG. 6 may be implemented in a server process, such as CCS server 400 in FIG. 4.

The process begins by receiving a request for an application from a client (step 600). This request may be received through a user selecting an application from a list of applications displayed at the client. Thereafter, the operating system for the client is identified (step 602). This identification of the operating system may be made as part of the request received from the client. Alternatively, the operating system of the client may be identified when the user registers for use with the service.

Next, a version of the requested application selected based on the identified operating system (step 604). The critical execution files are sent to the client (step 606). Thereafter, the billing process is started for the application (step 608). Step 608 in these illustrative examples involves starting a timer for the applications being used.

Billing agent 412 in the illustrative examples contains the processes for executing timers to identify the amount of usage for applications. Additionally, billing agent 412 may periodically send information to billing process 410 in case the connection between the two systems is cut or terminated accidentally. This data in the transmission is also referred to as "heartbeat" data. In this manner, when the session is closed and the user logs off, billing agent 412 sends a final set of data to billing process 410. This data contains the total usage for the session as well as an identification of the applications used. Billing process 410 then stores this information for billing purposes.

Figure 7:
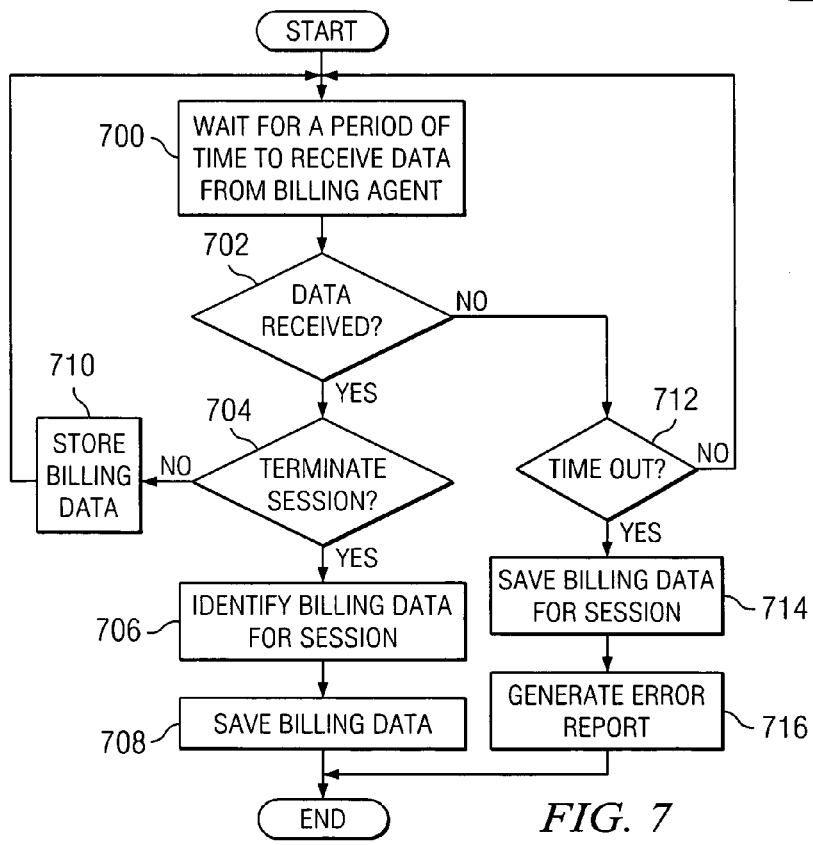
FIG. 7 is a flowchart of a process for monitoring application usage of a client in accordance with a preferred embodiment of the present invention.

Turning next to FIG. 7, a flowchart of a process for monitoring application usage of a client is depicted in accordance with a preferred embodiment of the present invention. The process illustrated in FIG. 7 may be implemented in a billing process on a server, such as billing process 410 in FIG. 4.

The process begins by waiting for a period of time to receive data from the billing agent (step 700). After the period of time has passed, a determination is made as to whether data has been received (step 702). The billing service expects heartbeat data from the billing agent on a periodic basis. If data has been received, a determination is made as to whether the data indicates that the session should be terminated (step 704). If the session is to be terminated, then final billing data is identified from the data received (step 706). This billing data is saved for the session (step 708) with the process terminating thereafter.

With reference again to step 704, if the session is not terminated, the billing data is saved (step 710) with the process then returning to step 700. This data is received and saved in the event that the connection with the billing agent is lost. In this manner, some billing information may be present for billing for the portion of the session.

With reference again to step 702, if data has not been received during the period of time, a determination is made as to whether a timeout has occurred (step 712). If a timeout has not occurred, the process returns to step 700. Otherwise, any billing data present for the client is saved as billing data for the session (step 714). An error report is generated to indicate that an unexpected termination has occurred (step 716) with the process terminating thereafter.

Figure 8:
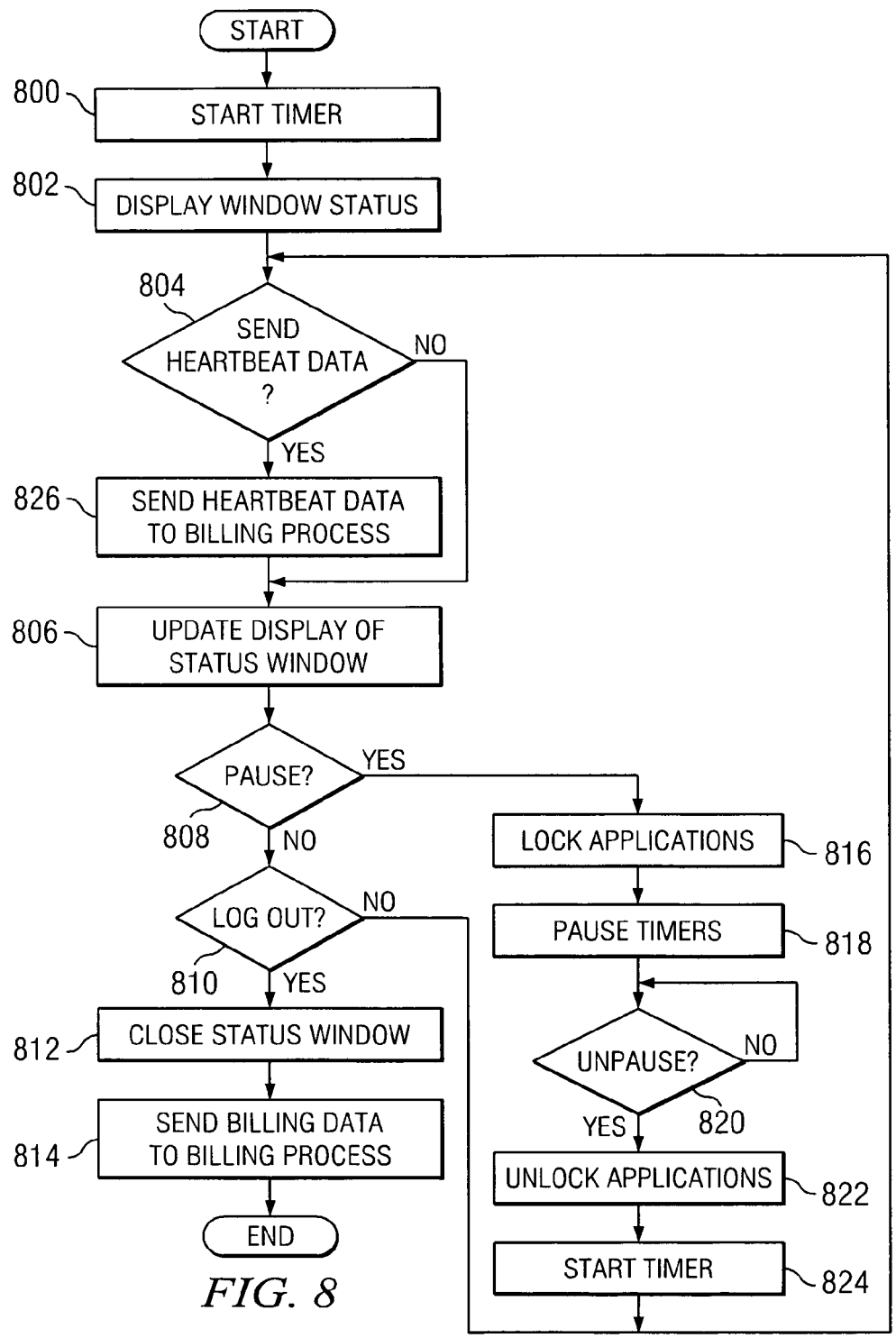
FIG. 8 is a flowchart of a process for monitoring use of applications on a client in accordance with a preferred embodiment of the present invention.

With reference now to FIG. 8, a flowchart of a process for monitoring use of applications on a client is depicted in accordance with a preferred embodiment of the present invention. The process illustrated in FIG. 8 may be implemented on a billing agent, such as billing agent 412 in FIG. 4.

The process begins by starting a timer (step 800). After the timer has been started, a status window is displayed (step 802). The status window displayed in step 802 is similar to status window 500 in FIG. 5. Next, a determination is made as to whether heartbeat data should be sent to the billing process (step 804). This determination is made by seeing whether some selected period of time has passed. Data typically is sent on a periodic basis to the billing process at the server to provide some data for billing purposes if the client should unexpectedly terminate or the connection should be terminated.

If heartbeat data is not to be sent, the display of the status window is updated (step 806). A determination is then made as to whether a user input has been received pausing the application (step 808). If a user input pausing the applications has not been received, a determination is made as to whether a user input has been received to log out or terminate the session (step 810). If the user does not terminate the session, the process returns to step 804 as described above. Otherwise, the status window is closed (step 812), and billing data is sent to the billing process (step 814) with the process terminating thereafter. The billing data sent in step 814 is a total of all time used for the applications.

With reference again to step 808, if a pause has been selected by the user, the applications are locked (step 816) and the timers are paused (step 818). Next, a determination is made as to whether the user has unpaused the applications (step 820). If the user has unpaused, the applications are unlocked (step 822) and the timer is started (step 824) with the process then returning to step 804 as described above.

With reference again to step 804, if a determination is made to send heartbeat data, the heartbeat data is then sent to the billing process (step 826) with the process then continuing to step 806 as described above.

Thus, the present invention provides an improved method, apparatus, and computer instructions for providing access to applications for users. The mechanism of the present invention avoids the users having to perform any maintenance to solve problems associated with bugs or updates. All of the updates, patches, and maintenance of applications are performed by the service through the CCS server as described above.

In this manner, the user also is able to select only applications that the user needs and avoids having to pay for applications which the user may never require. Further, the user also may have access to needed applications that are not as readily available in the user's location for purchase.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the illustrative embodiment frees or locks all of the applications when the pause button is selected. Depending on the particular implementation, the use of the pause function may be selective in which the user may pause only one or a few of the applications rather than all of the applications. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing access to an application, the method comprising:

responsive to receiving a request for access to the application from a client, identifying an operating system on the client;

responsive to identifying the operating system, selecting an appropriate version of the application for the client from a list of applications displayed at the client;

sending files required on the client for execution of the appropriate version of the application to the client, wherein execution of the appropriate version of the application is processed on the data processing system; and initiating a billing process to identify an amount of time during which the appropriate version of the application is used on the client, wherein the billing process comprises:

starting a timer to identify an amount of elapsed time in executing the appropriate version of the application on the data processing system;

displaying a status window, wherein the amount of elapsed time in executing the appropriate version of the application is presented in the status window;

responsive to the user input, pausing execution of the appropriate version of the application, wherein pausing increases the amount of the elapsed time while the pausing is in effect;

responsive to a user input, terminating execution of the appropriate version of the application;

identifying the amount of the elapsed time for the appropriate version of the application;

storing the identified amount of the elapsed time for the appropriate version of the application for use in billing the user;

sending a billing agent to the client, wherein the billing agent provides a display of status information regarding the identified amount of elapsed time, and current charges for the identified amount of elapsed time of the appropriate version of the application.

\* \* \* \* \*